(12) United States Patent
Holmes

(10) Patent No.: US 12,502,217 B2
(45) Date of Patent: Dec. 23, 2025

(54) TREATMENT APPARATUS

(71) Applicant: Michelson Diagnostics Ltd, Kent (GB)

(72) Inventor: Jonathan Denis Holmes, Kent (GB)

(73) Assignee: Michelson Diagnostics, Ltd., Kent (GB)

( * ) Notice: Subject to any disclaimer, the term of this patent is extended or adjusted under 35 U.S.C. 154(b) by 0 days.

(21) Appl. No.: 18/536,952

(22) Filed: Dec. 12, 2023

(65) Prior Publication Data

US 2024/0108408 A1    Apr. 4, 2024

Related U.S. Application Data

(63) Continuation of application No. 17/920,591, filed as application No. PCT/US2021/028148 on Apr. 20, 2021, now abandoned.

(30) Foreign Application Priority Data

Apr. 21, 2020   (GB) ..................................... 2005820

(51) Int. Cl.
*A61B 18/20* (2006.01)
*A61B 17/00* (2006.01)
*A61B 18/00* (2006.01)

(52) U.S. Cl.
CPC .......... *A61B 18/203* (2013.01); *A61B 18/201* (2013.01); *A61B 2017/00172* (2013.01);
(Continued)

(58) Field of Classification Search
CPC ................ A61B 18/203; A61B 18/201; A61B 2017/00172; A61B 2018/00452;
(Continued)

(56) References Cited

U.S. PATENT DOCUMENTS 6,514,278 B1    2/2003  Hibst et al.
2004/0073079 A1  4/2004  Altshuler et al.
(Continued)

FOREIGN PATENT DOCUMENTS

WO  WO-2005074830 A2 *  8/2005 ........... A61B 18/203
WO  WO-2020003138 A1 *  1/2020 ........... A61B 18/203
WO     2020/075025 A1     4/2020

OTHER PUBLICATIONS

Extended European Search Report issued in EP Application No. 21791900.0 on Mar. 20, 2024.
(Continued)

*Primary Examiner* — Niketa Patel
*Assistant Examiner* — Sebastian X Lukjan
(74) *Attorney, Agent, or Firm* — Cesari and McKenna, LLP; Steven M. Mills

(57) ABSTRACT

A treatment apparatus for treating a skin lesion on skin of a patient, the apparatus comprising a source of electromagnetic radiation (16), a guide (6, 20) to guide the electromagnetic radiation to the skin lesion (25) and a control apparatus (1), the control apparatus (1) being arranged so as to cause the source (16) and the guide (6, 20) to: provide an initial burst of electromagnetic radiation to the skin lesion (25) to heat it to a first temperature selected by the control apparatus (1); cease providing electromagnetic radiation to the skin lesion (25) for a period; and provide a further burst of electromagnetic radiation to the skin lesion (25) so as to maintain the temperature of the skin lesion within a temperature range selected by the control apparatus (1). The apparatus may comprise a temperature sensor (24) which detects the temperature of the patient's skin, typically the skin lesion.

3 Claims, 3 Drawing Sheets

(52) U.S. Cl.
CPC ............... *A61B 2018/00452* (2013.01); *A61B 2018/00791* (2013.01)

(58) Field of Classification Search
CPC ........... A61B 2018/00791; A61B 2018/00458; A61B 2018/00642; A61B 2018/0066; A61B 2018/00672; A61B 2018/00678; A61B 2018/00702; A61B 2018/00761; A61B 2018/00803; A61B 2018/00809; A61B 2018/2025; A61B 18/22; A61B 2018/20359
See application file for complete search history.

(56) References Cited

U.S. PATENT DOCUMENTS

| | | | |
|---|---|---|---|
| 2009/0012515 A1 | 1/2009 | Hoenig et al. | |
| 2010/0049178 A1 | 2/2010 | Deem et al. | |
| 2012/0010606 A1* | 1/2012 | Neev | A61B 18/203 606/28 |
| 2012/0041523 A1 | 2/2012 | Solomon et al. | |
| 2013/0197473 A1* | 8/2013 | McMillan | A61B 5/01 604/501 |
| 2014/0074191 A1 | 3/2014 | Dunleavy et al. | |
| 2014/0121631 A1 | 5/2014 | Bean et al. | |
| 2017/0027642 A1 | 2/2017 | Schuster | |
| 2017/0173360 A1* | 6/2017 | O'Neil | A61N 5/062 |
| 2018/0140866 A1 | 5/2018 | Daly et al. | |
| 2018/0207444 A1 | 7/2018 | Kim et al. | |
| 2018/0353772 A1 | 12/2018 | Chen et al. | |
| 2019/0262065 A1 | 8/2019 | Ko et al. | |
| 2019/0374791 A1 | 12/2019 | Tagliaferri et al. | |
| 2023/0149081 A1* | 5/2023 | Holmes | A61B 18/201 607/89 |

OTHER PUBLICATIONS

International Preliminary Report on Patentability of International Application No. PCT/US2021/028148 mailed on Oct. 25, 2022 (including International Search report Aug. 2, 2021).

* cited by examiner

TREATMENT APPARATUS

CROSS REFERENCE TO RELATED APPLICATIONS

This application claims priority to, and the benefit of, U.S. application Ser. No. 17/920,591, filed on Oct. 21, 2022, which is a U.S. national phase entry under 35 U.S.C. § 371 of International PCT Application No. PCT/US2021/028148, filed on Apr. 20, 2021, and which claims priority to and the benefit of United Kingdom Patent Application No. 2005820.2, filed on Apr. 21, 2020, all titled, "TREATMENT APPARATUS", the contents of each of which are incorporated herein by reference in its entirety.

FIELD OF THE DISCLOSURE

This invention relates to a treatment apparatus, and to methods of treating a subject.

BACKGROUND OF THE DISCLOSURE

In the field of treatment of cancer, there is a method known as hyperthermia, in which tissue is heated to a raised temperature and then maintained within a temperature range, such that the cancer cells die, but cells in surrounding healthy tissue survive as they are typically more resilient to raised temperatures then cancer cells. The method of heating can be any one of a variety of methods, such as radio frequency, high frequency focused ultrasound, or application of a heated needle into the tissue. The method that is chosen is dependent on the organ affected.

For skin, it is already known that lasers can produce heating effects. The precise amount of heating and depth of tissue affected is governed by parameters such as the laser spot size, laser wavelength, and fluence (energy delivered per unit area). Typically, a pulsed laser is used in order to provide a precisely controlled amount of heat to the targeted area in one go. One example of such a treatment is hair removal, using the Nd:YAG pulsed laser.

The Nd:YAG laser has already been evaluated for treating non-melanoma skin cancer (NMSC) by heating the lesions. The laser was used to deliver a series of pulses in the local area of the tumour, aimed by and with number of pulses controlled by the user, until a change was observed in the tissue comprising a change of colour to grey, indicating that the skin tissue has heated to the point where it is necrotic. However, the users reported that the treated skin first typically produces a blister, and may ulcerate, and may produce an unsightly scar. These side effects are unpredictable and limit acceptance of the method by patients and clinicians.

It is also known that skin tissue is very sensitive to the temperature that it reaches. It is reported in the literature that the heating time taken for tissue to become necrotic halves by each additional degree centigrade of temperature; thus a 5° C. rise corresponds to 32× faster necrosis. It follows that accidentally heating the skin to a higher temperature, for example by overlapping two laser pulses, could easily lead to unwanted necrosis of healthy skin. The published data shows that at 60° C. the time for necrosis of healthy skin is 5 seconds and so it is desirable not to exceed 60° C. if necrosis of healthy tissue is to be avoided.

SUMMARY OF THE DISCLOSURE

In accordance with a first aspect of the invention, there is provided a treatment apparatus for treating a skin lesion on skin of a patient, the apparatus comprising a source of electromagnetic radiation, a guide to guide the electromagnetic radiation to the skin lesion and a control apparatus, the control apparatus being arranged so as to cause the source and the guide to:
 a) provide an initial burst of electromagnetic radiation to the skin lesion to heat it to a first temperature selected by the control apparatus;
 b) cease providing electromagnetic radiation to the skin lesion for a period; and
 c) provide a further burst of electromagnetic radiation to the skin lesion so as to maintain the temperature of the skin lesion within a temperature range selected by the control apparatus.

This allows for the controlled delivery of (e.g.) laser pulses to skin more precisely, so as to control the temperature that the skin is raised to, and to control the area of skin that is treated in order to minimise the amount of healthy tissue that is treated. Pausing for a period allows the skin to cool before it is heated again by the further burst.

Typically, the first temperature is at least 45, 50 or 55 degrees centigrade, and at most 57, 59, or 60 degrees centigrade. The temperature range may have lower and upper bounds; the lower bound may be between 50 and 57 degrees centigrade, or between 53 and 56 degrees, or be 55 degrees±1 degree centigrade; the upper bound may be between 58 and 61 degrees, typically 60 degrees±1 degree centigrade. The first temperature may be within the temperature range, which may extend a maximum of 3, 5 or 10 degrees above and/or below the first temperature.

The period may between 1 and 30 seconds, typically between 15 and 20 seconds.

The control apparatus may be arranged to repeat steps b and c at least once, and preferably a plurality of times. By repeating the steps, the temperature of the skin lesion can be maintained within the temperature range.

The exact target temperature range, the number of pulses delivered and total time of delivery can be chosen by the user in order to balance the thermal dose delivered to the cancer for maximum efficacy against minimizing the damage caused to healthy tissue. As such, the control apparatus may be arranged to determine the first temperature, the temperature range and the period based upon user input and/or pre-programming.

The initial burst can comprise a single pulse, or a series of pulses; it being advantageous to use more than one pulse in order to limit the damage to the epidermis which, because it contains melanin which absorbs light at the wavelengths of typical Nd:YAG sources wavelengths, heats up faster than the dermis and may be disrupted if it is subjected to one large pulse causing it to heat up excessively.

It is also desirable to control the area of delivery of hyperthermia treatment to the lesion so that the amount of healthy tissue that is treated is minimized. Previously, this was achieved by the user manually aiming the beam to different parts of the lesion until the whole area has been treated, but as was previously mentioned, this can easily result in some areas being over-treated or under-treated.

In a preferred embodiment of the apparatus, the guide comprises a beam steering apparatus to direct the initial and/or further bursts over the patient's skin. The apparatus may further comprise a source of a visible light aiming beam, to help the user position the initial and further bursts on the skin lesion. The beam steering apparatus may comprise an optical system comprising at least one steerable optical component which is arranged to steer the initial and further bursts and the visible light aiming beam. Each steerable optical component may act to steer both the initial and further busts and the visible light aiming beam. The control apparatus may control the visible light aiming beam source and the source of electromagnetic radiation so that they are not active at the same time, or at least so that the source of electromagnetic radiation is not active to generate the initial or further bursts when the visible light aiming beam is being used to generate an indication of the treatment area. As such, only one set of steering optical components may be needed. As an example, each steering component may comprise a rotatable mirror.

The control apparatus may be configured by the user so as to control the guide to deliver a series of pulses over a target area so that heat energy is delivered uniformly over the target area and not outside it. Furthermore, the target area size and shape can be set in advance by the user so that it covers the tissue of the skin lesion with a chosen overlap into healthy tissue.

Even with the above more controlled method and apparatus for delivering hyperthermia treatment, there remains a risk that the subject's skin will over the course of the treatment either reach steadily higher than desired temperatures, or conversely cool faster than anticipated. This might occur due to the skin being thicker or thinner, or having more or less blood vessel density, or being a different skin colour, or otherwise varying. It is desirable to detect this slow deviation and to adjust the treatment to compensate for it in order to maintain the temperature exactly within limits.

The apparatus may therefore comprise a temperature sensor which detects the temperature of the patient's skin and in particular the skin lesion. The temperature sensor may be a focused infrared (IR) sensor. The temperature sensor may be arranged to measure the temperature of the skin lesion and predetermined time intervals after each initial or further burst. As such, by comparing the temperature measurements from each treatment at the same time interval, it can be found whether the temperature is trending up or down and by how much. This information can be used to adjust the next treatment, for example by reducing or increasing the fluence, or increasing or reducing the time delay before the next treatment, or both. In one embodiment, the period is kept constant, but the fluence varied.

The control apparatus may be arranged to calibrate the skin response to treatment by causing the source of electromagnetic radiation to deliver a calibration burst which is smaller than required to reach the first temperature, and to measure, using the temperature sensor, the resulting temperature increase and rate of cooling. The control unit can be arranged to as to determine at least one of a fluence of the initial and further bursts and the period based upon the temperature increase and the rate of cooling.

The source of electromagnetic radiation may comprise a laser. The laser may be selected from the group comprising a Nd:YAG laser, a Diode laser, a Pulsed Dye laser, an Intense Pulsed Light Source, a CO 2 laser, a Thulium laser, a Holmium laser and an Alexandrite laser. The source of electromagnetic radiation may provide electromagnetic radiation with a wavelength between 500 nm-2000 nm. The source of the visible light aiming beam may also comprise a laser, such as a diode laser.

The skin lesion may be any of a basal cell carcinoma, a squamous cell carcinoma, a haemangioma, and a port wine stain or other lesions that can be treated with hyperthermia.

Typically, the patient would typically be a human.

In accordance with a second aspect of the invention, there is provided a method of treating a skin lesion on skin of a patient, the method comprising:

a) providing an initial burst of electromagnetic radiation to the skin lesion to heat it to a predetermined first temperature;
b) ceasing providing electromagnetic radiation to the skin lesion for a period; and
c) providing a further burst of electromagnetic radiation to the skin lesion so as to maintain the temperature of the skin lesion within a predetermined temperature range.

This allows for the controlled delivery of (e.g.) laser pulses to skin more precisely, so as to control the temperature that the skin is raised to, and to control the area of skin that is treated in order to minimise the amount of healthy tissue that is treated. Pausing for a period allows the skin to cool before it is heated again by the further burst.

Typically, the first temperature is at least 45, 50 or 55 degrees centigrade, and at most 57, 59, or 60 degrees centigrade. The temperature range may have lower and upper bounds; the lower bound may be between 50 and 57 degrees centigrade, or between 53 and 56 degrees, or be 55 degrees±1 degree centigrade; the upper bound may be between 58 and 61 degrees, typically 60 degrees±1 degree centigrade. The first temperature may be within the temperature range, which may extend a maximum of 3, 5 or 10 degrees above and/or below the first temperature.

The period may be between 1 and 30 seconds, typically between 15 and 20 seconds.

The method may comprise repeating steps b and c at least once, and preferably a plurality of times. By repeating the steps, the temperature of the skin lesion can be maintained within the temperature range.

The exact target temperature range, the number of pulses delivered and total time of delivery can be chosen by the user in order to balance the thermal dose delivered to the cancer for maximum efficacy against minimizing the damage caused to healthy tissue. As such, the first temperature, the period and the temperature range may be predetermined based upon user input.

The initial burst can comprise a single pulse, or a series of pulses; it being advantageous to use more than one pulse in order to limit the damage to the epidermis which, because it contains melanin which absorbs light at the wavelengths of typical Nd:YAG sources wavelengths, heats up faster than the dermis and may be disrupted if it is subjected to one large pulse causing it to heat up excessively.

It is also desirable to control the area of delivery of hyperthermia treatment to the lesion so that the amount of healthy tissue that is treated is minimized. Previously, this was achieved by the user manually aiming the beam to different parts of the lesion until the whole area has been treated, but as was previously mentioned, this can easily result in some areas being over-treated or under-treated.

The method may comprise using a beam steering apparatus to direct the initial and/or further bursts over the patient's skin. The method may also comprise generating a visible light aiming beam, to help the user position the initial and further bursts on the skin lesion.

The method may comprise using the beam steering apparatus so as to deliver a series of pulses over a target area so that heat energy is delivered uniformly over the target area and not outside it. Furthermore, the method may comprise a user setting the target area size and shape so that it covers the tissue of the skin lesion with a chosen overlap into healthy tissue.

The method may comprise detecting the temperature of the skin lesion, typically using a temperature sensor such as a focused infrared (IR) sensor. The method may comprise measuring the temperature of the skin lesion at predetermined time intervals after each initial or further burst. As such, by comparing the temperature measurements from each treatment at the same time interval, it can be found whether the temperature is trending up or down and by how much. This information can be used to adjust the next treatment, for example by reducing or increasing the fluence, or increasing or reducing the time delay before the next treatment, or both. In one embodiment, the period is kept constant, but the fluence varied.

The method may comprise calibrating the skin response to treatment by delivering a calibration burst of electromagnetic radiation which is smaller than required to reach the first temperature and measuring the resulting temperature increase and rate of cooling. The method may then comprise determining at least one of a fluence of the initial and further bursts and the period based upon the temperature increase and the rate of cooling.

Typically, the patient would typically be a human.

The method may comprise using the apparatus of the first aspect of the invention.

BRIEF DESCRIPTION OF THE DRAWINGS

There now follows, by way of example only, description of an embodiment of the invention described with reference to the accompanying drawings, in which.

DETAILED DESCRIPTION

Figure 1:
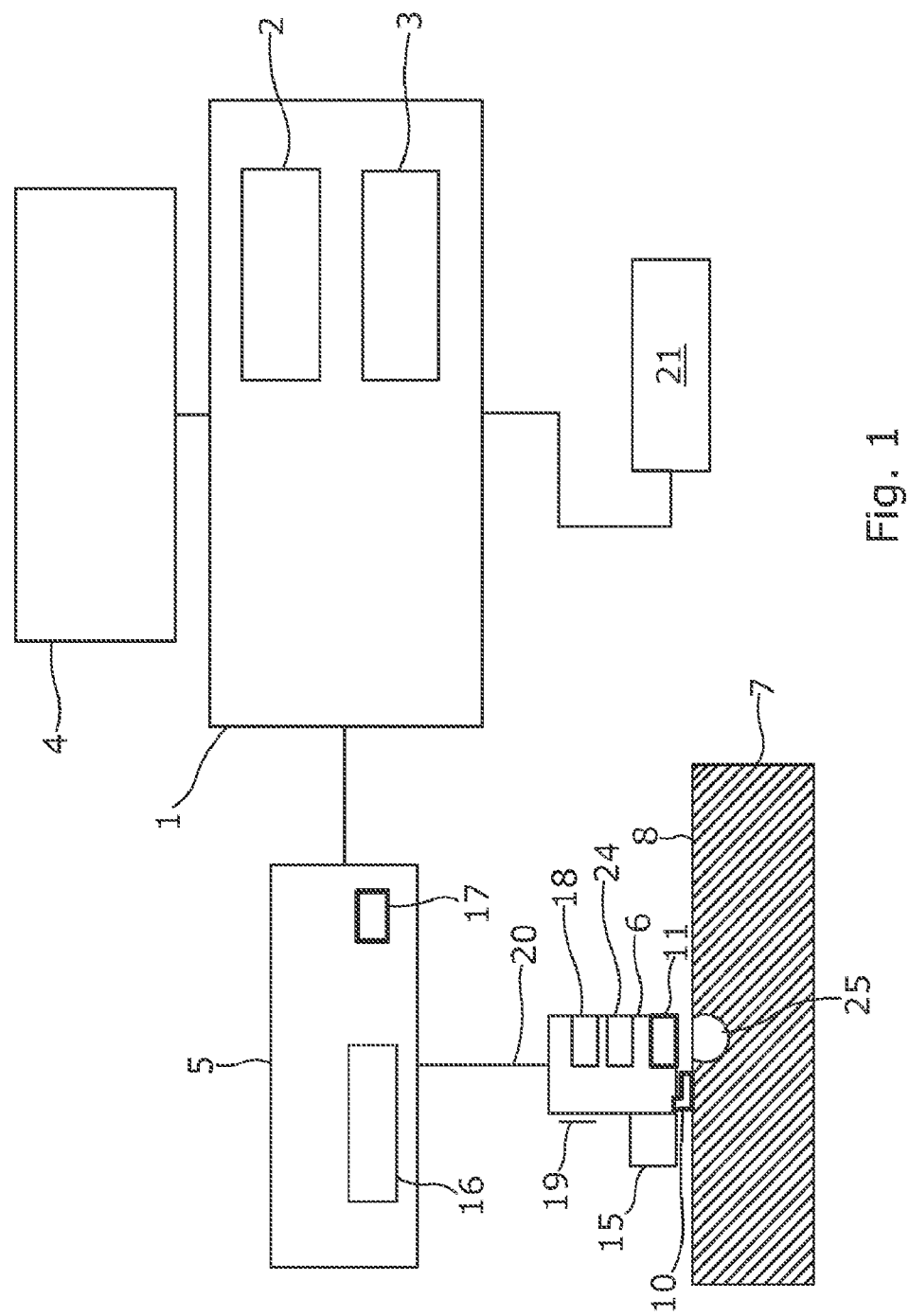
FIG. 1 shows schematically an apparatus in accordance with an embodiment of the invention.

A treatment apparatus in accordance with an embodiment of the invention is shown in FIG. 1 of the accompanying drawings. This comprises a computer 1, having a processor 2 and storage 3 (such as a mass storage device or random access memory) coupled to the processor 2. The storage 3 contains data and processor instructions which cause the processor 2 to act as is described below. The computer 1 can be any suitable model; typically a personal computer running an operating system such as Microsoft® Windows® or Apple® Mac OS X® can be used. The computer 1 is also provided with a display 4 controlled by the processor 2 on which any desired graphics can be displayed, and a sound output device 15 such as a buzzer which can sound an alert noise.

The apparatus further comprises treatment device 5 having an associated handheld probe or handpiece 6. The treatment device comprises two sources—a visible light source 17 and a treatment source 16 creating a visible light beam and a treatment beam respectively. These are both coupled to probe 6 through hollow articulated arm 20 with beam-steering optics in the joints which direct collimated light from the laser sources to the probe (although in an alternative a fibre-optic cable, optical waveguide or other beam directing and transmission means can be used). The probe has a stand-off 10 which spaces the probe 6 from the subject's skin 7.

Typically, the treatment source 16 can be any of a Nd:YAG laser, a Diode laser, a Pulsed Dye laser, a $CO_2$ laser, a Thulium laser, a Holmium laser and an Alexandrite laser.

The probe 6 also has a beam steering apparatus formed within (typically comprising at least one rotating mirror), which can steer the beams as they are provided through the arm 20 throughout the field of view of the camera.

The user can then input the treatment area, which will typically include a skin lesion 25. This can be done, for example, using the methods set out in our UK Patent application number 1919208.7 or PCT application PCT/GB2020/053278, the contents of which are hereby incorporated by reference. Alternatively, any convenient method of indicating area to be treated can be used.

After imaging the treatment area and calculating the treatment area and matching treatment spot pattern, the beam steering mechanism will direct the visible low-intensity aiming beam to rapidly trace out the spot pattern. Thus, the user will have visible confirmation of exactly where the treatment will be delivered. If for some reason, it is not correct, then the user can take appropriate action such as adjusting the treatment settings. Only when the user is satisfied that the visible low-intensity aiming beam is tracing out the correct area can the treatment itself be instigated by use of a foot pedal 21.

Figure 2:
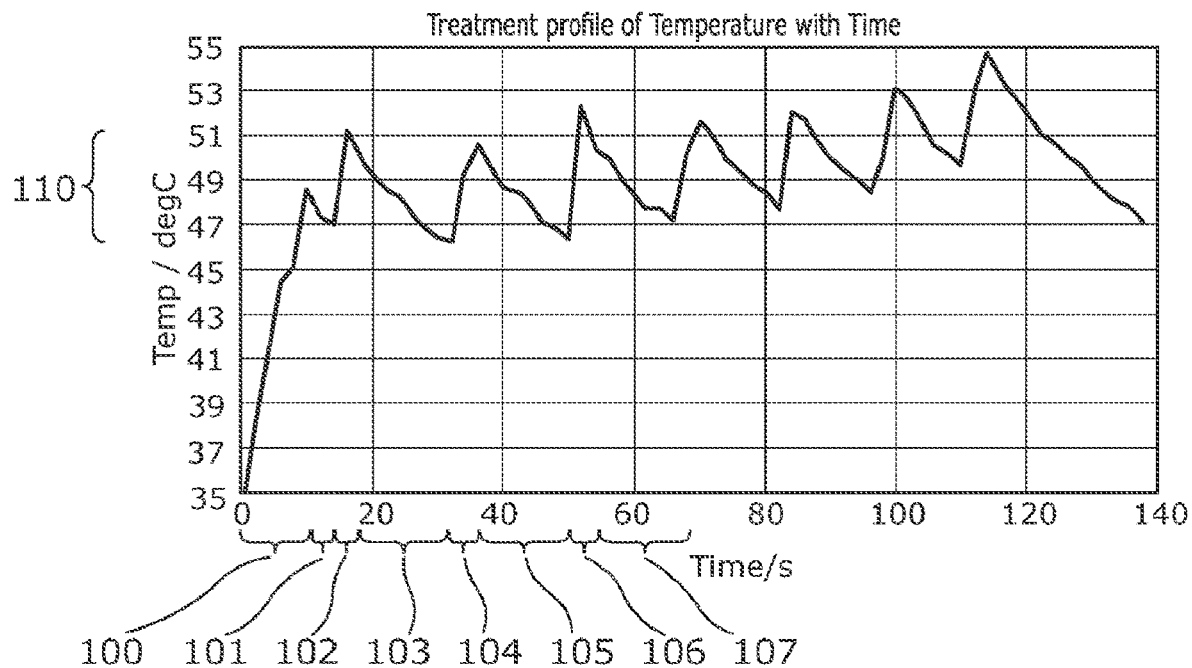
FIG. 2 shows the effect on the temperature of a patient's skin of the use of the apparatus of FIG. 1.

In order to provide the treatment of the skin lesion 25, a series of pulses are provided. The effects of this can be seen in the graph shown in FIG. 2 of the accompanying drawings. This shows the temperature of a skin lesion 25 with time.

In time period 100, an initial burst of EM radiation is provided to the skin lesion. This has the effect of bringing the temperature of the lesion from about 35 degrees centigrade (close to body temperature) to around 48 degrees centigrade. The initial burst then stops in period 101, and the skin lesion 25 cools by a few degrees.

Further bursts in periods 102, 104, 106 and so on keep the temperature within a range indicated at 110. Pauses 103, 105 and 107 and so on each allow the skin lesion to cool after a respective further burst.

Figure 3:
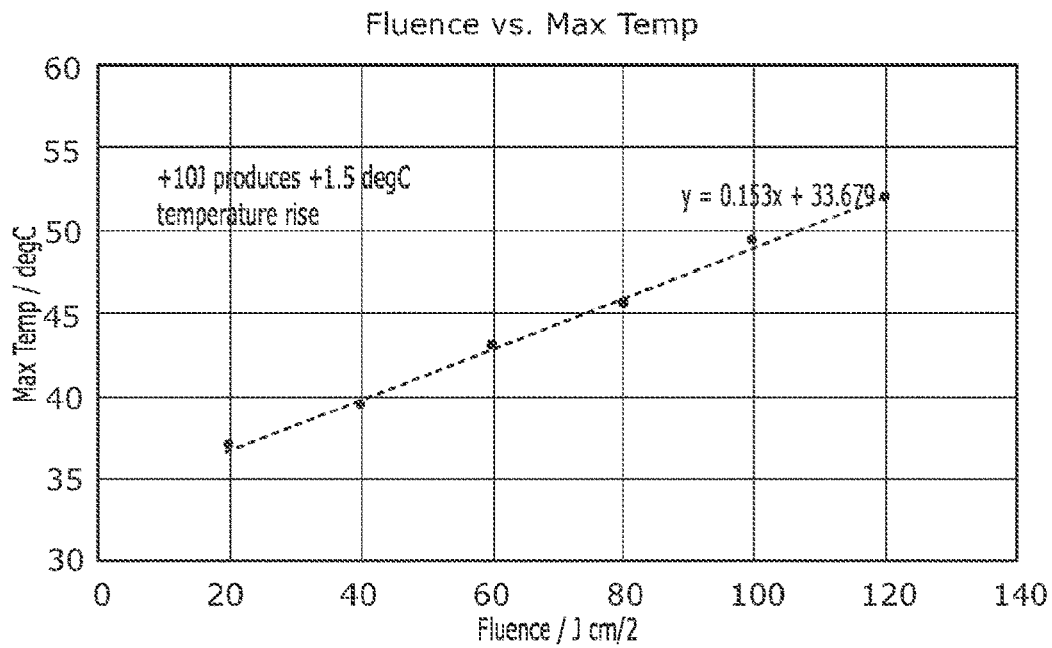
FIG. 3 shows the relationship between fluence of each burst and temperature increase of the patient's skin.

The temperature increase due to each burst shows a simple relationship with the fluence of the burst in question, as shown in FIG. 3 of the accompanying drawings, for some sample skin. This shows an effectively linear relationship between temperature increase and fluence. However, the exact relationship will vary from patient to patient.

Figure 4:
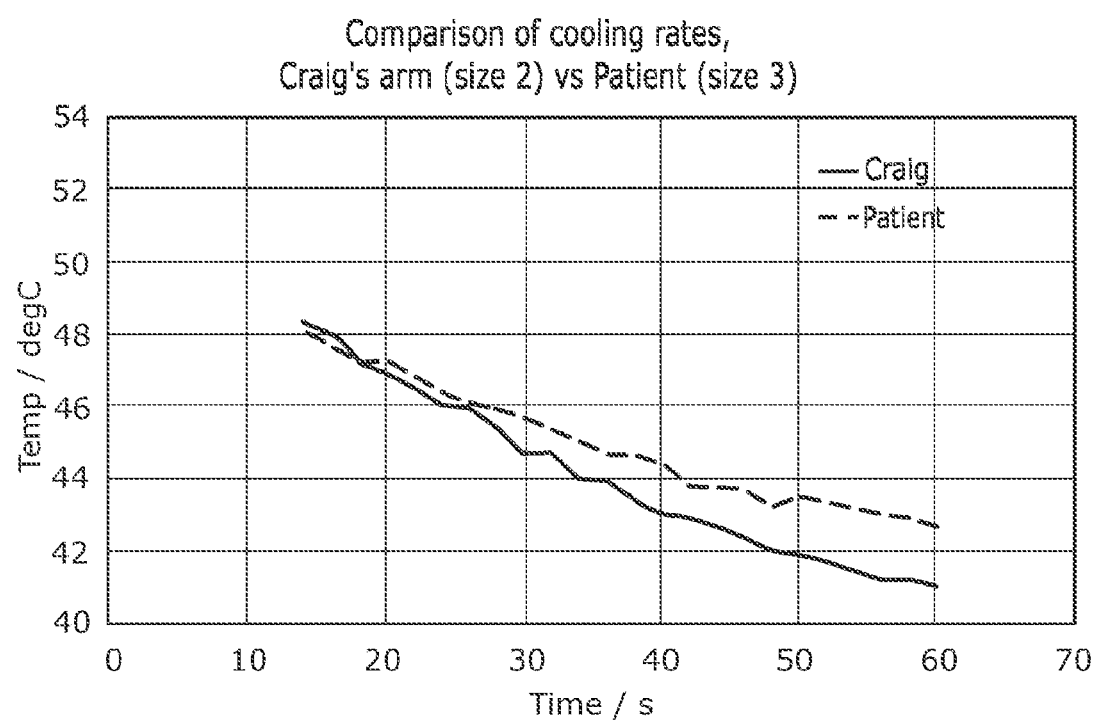
FIG. 4 shows different cooling rates for different patient's skin.

Likewise, cooling rates can vary from patient to patient, as shown in FIG. 4 of the accompanying drawings, which shows the skin of two differently-sized patients cooling from roughly the same starting point.

As such, it could be possible for the processor to predict from patient characteristics the heating and cooling characteristics of the patient's skin. However, as an alternative, it may be desirable to transmit a calibration burst—not enough to reach temperatures which would have a therapeutic effect—and determine using a temperature sensor 24 (such as a focussed IR temperature sensor) both the temperature increase that that caused, and the rate at which the patient's skin cools afterwards. The computer 1 can then use these data to determine the fluence, duration and separation of the bursts.

The invention claimed is:

1. A method of treating a skin lesion being any of a basal cell carcinoma and a squamous cell carcinoma on skin of a patient, the method comprising:
   a) using a laser to provide an initial burst of electromagnetic radiation to the skin lesion to heat it to a predetermined first temperature;
   b) ceasing providing electromagnetic radiation to the skin lesion for a period of at least 1 second; and c) providing a further burst of electromagnetic radiation to the skin lesion so as to maintain the temperature of the skin lesion within a predetermined temperature range in which the temperature range has upper and lower bounds, and the upper bound is between 58 and 61 degrees centigrade.

2. The method of claim 1, comprising:

providing a treatment apparatus for the method of treating a skin lesion on skin of a patient, the apparatus comprising a source of electromagnetic radiation, a guide to guide the electromagnetic radiation to the skin lesion and a control apparatus, using the treating apparatus for the method of treating a skin lesion on skin of a patient, said control apparatus being arranged so as to cause the source and the guide to carry out steps a)-c), wherein the predetermined first temperature and the predetermined temperature range are selected by the control apparatus.

3. The method of claim 1, in which the lower bound is between 50 and 57 degrees centigrade.

\* \* \* \* \*